July 9, 1940.  F. E. RICE  2,207,159
SEALING MEANS
Filed Feb. 8, 1939
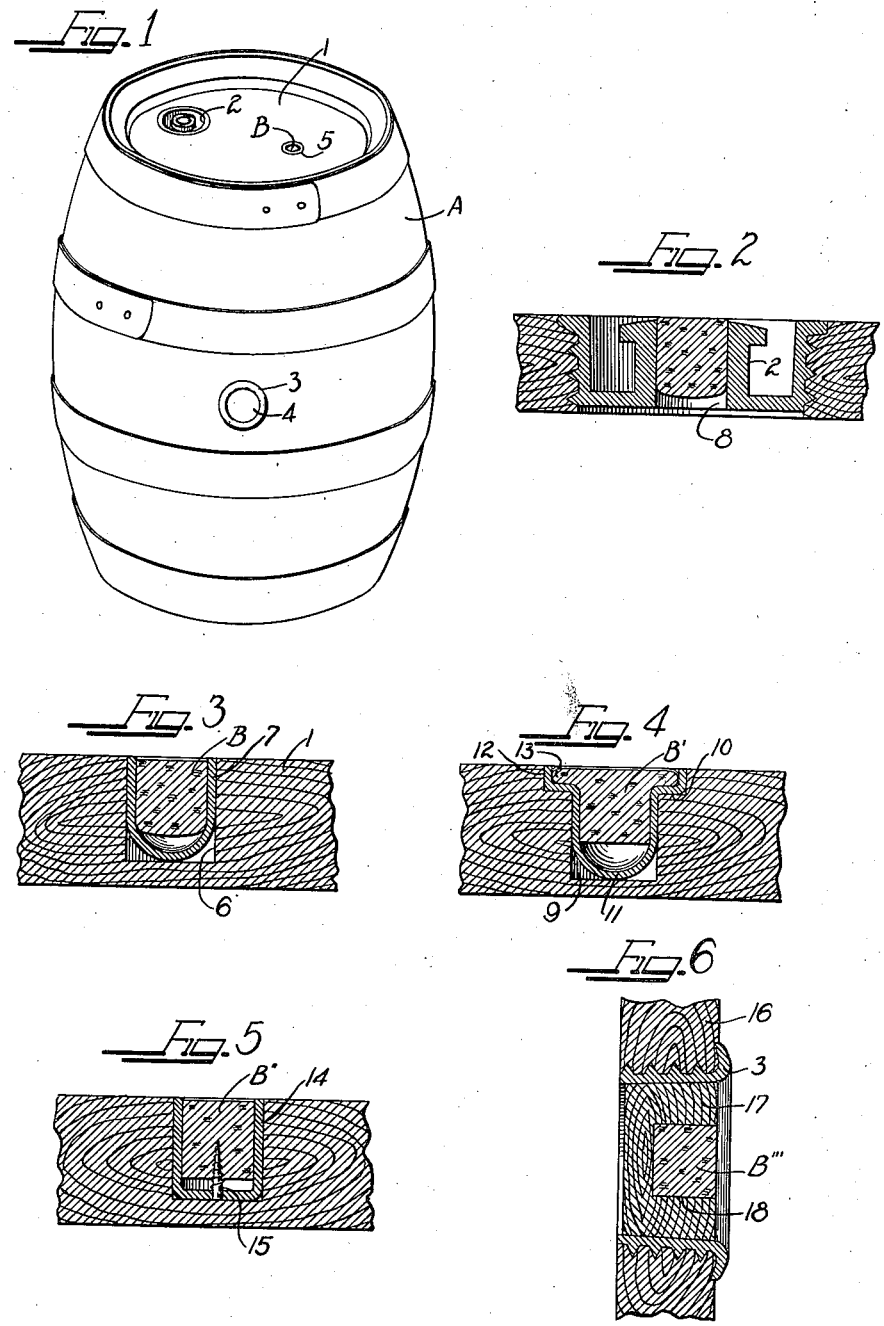
Inventor
FRANK E. RICE
by Charles O'Neill Attys.

Patented July 9, 1940

2,207,159

UNITED STATES PATENT OFFICE 2,207,159

SEALING MEANS

Frank E. Rice, Detroit, Mich.

Application February 8, 1939, Serial No. 255,195

5 Claims. (Cl. 217—98)

The present invention relates to sealing means and more particularly to means carried by beer barrels or kegs for plugging the tap openings after the barrels or kegs have been emptied, to seal the barrels or kegs for return to the breweries for reuse.

It is the custom, in connection with the return of empty beer barrels or kegs to the breweries from the consumers, to ship the barrels or kegs with the tap bushes open. This practice has demonstrated that oftentimes such barrels or kegs become contaminated by foreign matter entering through the open tap openings requiring additional time and expense in connection with the reconditioning of such barrels for reuse. Furthermore, such open tap openings sometimes expose the barrels to weather conditions which dry the barrels and sometimes dry the pitch linings, requiring cooperage expense to recondition the barrels and other expense for relining or repitching the interiors.

An object of the present invention has to do with the provision of ways and means for equipping barrels and kegs for use with beer, ale, and other products, with stoppers or plugs to be used for plugging the tap bush openings after the barrels or kegs have been emptied so that such barrels or kegs may be returned to the breweries sealed against entry of contaminating influences.

Another object of the present invention is to provide a beer barrel or keg with a spare stopper or plug for plugging the tap bush opening when the keg is emptied and the tap tube removed from the keg.

A further object of the invention is to provide a spare stopper or plug carried in a suitable manner in a beer barrel or keg conveniently arranged near the tap bush, to be used for plugging the tap bush after the keg has been emptied and is ready for return to the brewery, the proximity of the spare plug serving as a reminder to the bartender to plug the tap bush opening.

A still further object of the present invention has to do with the equipment of beer barrels or kegs with sealing means, such, for example, as corks or plugs, for use in sealing the keg outlets after the kegs have been emptied of their contents, so that the kegs may be returned in sealed condition to the breweries for reuse.

The present invention has herein been illustrated and will be described in connection with wooden beer barrels or kegs, although it is to be understood that the invention is susceptible and capable of use with metal barrels or kegs.

The above, other, and further objects of the present invention will be apparent from the following description and accompanying drawing.

The accompanying drawing illustrates embodiments of the present invention, and the views thereof are as follows:

Figure 1 is an isometric view of a beer barrel or keg, of wooden construction, showing a tap bush inserted in a head and a sealing medium, such as a cork or plug, carried by a pocket in the head, in proximity to the tap bush, which plug may be utilized for sealing the tap bush opening when the contents of the barrel have been withdrawn;

Figure 2 is a vertical sectional view through a tap bush of known form, showing a sealing plug or cork in sealing relation in the draught tube opening through the bush;

Figure 3 is a vertical sectional view through a portion of a head of a wooden barrel or keg, showing one form of retaining means for carrying the spare stopper or cork;

Figure 4 is a view similar to Figure 3, showing another form or shape of cork and its retaining pocket;

Figure 5 is a view similar to Figures 3 and 4, showing still another form; and

Figure 6 is a vertical sectional view through the side bung of a wooden barrel, showing the spare stopper or cork carried in a pocket formed in the bung plug.

The drawing will now be explained.

Figure 1 illustrates a wooden beer barrel or keg A having a head 1 in which is applied the usual tap bush 2. The filling or side bung 3 is closed by a suitable plug 4 as is common practice.

In the head 1 of the barrel, a spare stopper or cork B is shown as inserted in a pocket 5 set into the head of the barrel.

Referring to Figure 3, the head 1 of the barrel is counterbored at 6 into which counterbore is inserted a bushing 7. Inserted within the bushing 7 is the spare stopper or cork B.

The spare stopper or cork B is of such size as to tightly fill the draught tube opening 8 of the tap bush 2, to seal this opening. The bushing 7 is of such size, with respect to the stopper or cork B, as to retain the cork or stopper in position, against accidental displacement, whatever rough handling the keg or barrel may receive, when filled. However, the fit of the stopper or plug B in the bushing 7 is such as to enable removal of the plug or stopper without damaging it, when it becomes necessary to plug the draught tube opening 8 of the tap bush, after the barrel has been emptied of its contents, for the purpose of sealing the barrel for return to the brewery.

The form illustrated in Figure 4 is similar to that illustrated in Figure 3, except that the bore 9 is counterbored at 10, and the bushing 11 is provided with an annular enlargement 12 adjacent its open end, to receive the correspondingly shaped flange 13 of a spare stopper or plug B'. In this form of the invention, the enlarged head of the stopper or plug B' might be utilized for carrying advertising matter, or for carrying instructions as to the use of the plug or stopper in sealing the tap bush opening 8 when the barrel has been emptied.

In the arrangement disclosed in Figure 5, the bushing 14 receives the plug or stopper B'', and in addition is provided with a spike or screw 15 wherein the stopper or plug B' may be held in place within the bushing 14, by screwing the stopper onto the screw 15 or pushing it onto this protuberance when the same is in the nature of a nail or spike.

Figure 6 shows a side bung 3 inserted in a stave 16 of the barrel structure which bung is closed by a plug 17.

The plug 17, in this instance, is counterbored at 18 to receive the spare plug or stopper B''' with frictional fit to retain the stopper in place and yet at the same time allow ready removal of the stopper when it becomes necessary to insert it in the tap bush of the empty barrel.

Figure 2 illustrates the draught tube opening 8 of the tap bush 2 as closed by a plug, such as any of the stoppers herein described.

It will be observed that, in the present invention, the barrel or keg is provided with a spare plug or stopper which is applied to a pocket at the brewery at the time the barrel is filled, the tap bush being closed in the usual manner by a cork after the barrel has been filled or before it has been filled, the filling being done through the side bung 3.

When such a barrel is set up for use, the usual tap is applied to the tap bush in a known manner, and a draught tube is inserted through the tap and into the barrel, pushing the cork into the interior of the barrel for entry of the tube into the barrel. The tube remains in the barrel until the barrel contents are withdrawn, and then the tube is removed from the barrel, the tap removed from it, and the spare plug or stopper B then driven into the tube opening 8 of the tap bush, thus sealing the barrel so that no foreign matter may enter the barrel on its return to the brewery.

The various pockets formed for retaining the spare plugs are of such character as to properly retain the plugs against accidental displacement and at the same time prevent injury to these plugs as the barrel is handled in shipment and in use, as the exposed end of spare stopper or plug is at least flush with adjacent surface of the barrel and with no portion of the stopper or plug projecting outwardly of such adjacent surface to be harmed.

The gist of the present invention has to do with the support and transportation, within a beverage container or within the material comprising the container, of a sealing medium, such, for example, as a cork or plug, which is used to seal the container after the contents have been withdrawn, so that the container may be returned to the brewery for reuse without entry of contaminating matter to the interior of the container.

When the present invention is used with metal barrels or kegs, the tap bush and the bung are welded in place, and the spare stopper or plug bushing may be likewise welded or otherwise firmly fixed in place in some portion of the metal barrel or keg, preferably in the head which carries the tap bush.

The spare stopper or plug is housed in the barrel or keg, in a suitable manner to render the stopper available for use when the time arrives for sealing the empty barrel after its contents have been withdrawn.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. The combination with a beer barrel equipped with a tap bush of the type requiring a stopper to plug it when the barrel is filled, of a spare stopper to plug the bush when the barrel is shipped empty, and means within the confines of the barrel structure for housing said spare stopper with its exposed end at least flush with the barrel surface to prevent damage to the stopper while not in use.

2. The combination with a beer barrel equipped with a tap bush of the type requiring a stopper to plug it when the barrel is filled, of a spare stopper to plug the bush when the barrel is shipped empty, a bushing inserted in said barrel and constituting a housing for said spare stopper to protect it from harm, the arrangement being such that no part of the spare stopper when housed is exposed to damage when the barrel is subjected to rough handling.

3. The combination with a beer barrel equipped with a tap bush of the type requiring a stopper to plug it when the barrel is filled, of a spare stopper to plug the tap bush when the barrel is shipped empty, a bung plug having a counterbore in it entering from its outer surface and constituting a housing for the spare stopper to prevent it from damage incidental to the handling of the barrel.

4. The combination with a beer barrel equipped with a tap bush of the type requiring a stopper to plug it when the barrel is filled, of a spare stopper to plug the tap bush when the barrel is shipped empty, a cuplike bushing inserted in said barrel and constituting a housing for the spare stopper arranged so that when the stopper is housed in it the exposed end of the stopper is at least flush with the adjacent surface of the barrel.

5. The combination with a beer barrel equipped with a tap bush of the type requiring a stopper to plug it when the barrel is filled, of a spare stopper to plug the tap bush when the barrel is shipped empty, and a shell countersunk in said barrel adapted to constitute a housing for said spare stopper.

FRANK E. RICE.